(12) United States Patent
Nelson

(10) Patent No.: US 7,543,664 B2
(45) Date of Patent: Jun. 9, 2009

(54) MONO-TRACK VEHICLE

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 508 days.

(21) Appl. No.: 10/568,916

(22) PCT Filed: Sep. 15, 2004

(86) PCT No.: PCT/US2004/030178

§ 371 (c)(1),
(2), (4) Date: Feb. 16, 2006

(87) PCT Pub. No.: WO2005/032885

PCT Pub. Date: Apr. 14, 2005

(65) Prior Publication Data

US 2006/0225928 A1    Oct. 12, 2006

Related U.S. Application Data

(60) Provisional application No. 60/504,514, filed on Sep. 18, 2003.

(51) Int. Cl.
*B62D 55/00* (2006.01)
*B62D 55/07* (2006.01)

(52) U.S. Cl. ............................ 180/9.1; 180/9; 180/9.44

(58) Field of Classification Search ................ 180/9.44, 180/6.2, 6.24, 9, 9.1, 9.46, 186; 188/5, 6, 188/7

See application file for complete search history.

(56) References Cited

U.S. PATENT DOCUMENTS

| 1,275,600 | A |   | 8/1918  | Reed |
| 1,356,497 | A |   | 10/1920 | Taylor |
| 3,698,497 | A |   | 10/1972 | Bombardier |
| 3,867,992 | A |   | 2/1975  | Waterman |
| 4,865,142 | A |   | 9/1989  | Roy |
| 5,957,230 | A | * | 9/1999  | Harano et al. ................ 180/190 |
| 6,308,966 | B1 |  | 10/2001 | Cook et al. |
| 6,425,450 | B1 |  | 7/2002  | Lansberry |
| 2001/0047894 | A1 | | 12/2001 | Maguire |
| 2004/0004395 | A1 | | 1/2004  | Soucy et al. |

\* cited by examiner

*Primary Examiner*—Christopher P Ellis
*Assistant Examiner*—Marc A Scharich
(74) *Attorney, Agent, or Firm*—Aisha Ahmad

(57) ABSTRACT

A vehicle includes a motorized belt track directly or indirectly connected to a frame. The belt track frictionally contacts a drive surface on which the vehicle moves, such as any form of road or off-road surface. The belt track moves forward and backward in a direction parallel to a centerline of the belt track to move the vehicle backward and forward along the drive surface. A steering appendage is also directly or indirectly connected to the frame. The steering appendage is also adapted to frictionally contact the drive surface. The steering appendage is off the centerline of the belt track. The steering appendage causes the vehicle to turn from the centerline of the belt track when in contact with the drive surface.

12 Claims, 4 Drawing Sheets

MONO-TRACK VEHICLE

CROSS-REFERENCE TO RELATED APPLICATIONS

This application claims the benefit of prior filed co-pending U.S. Provisional Application No. 60/504,514 filed on Sep. 18, 2003.

BACKGROUND AND SUMMARY

The invention generally relates to a vehicle (large or small), cart, robot, etc. that uses a mono-track (e.g., single-track or uni-track) for its main motion in place of wheels or multiple tracks, although the invention could be applied to multi-track and wheeled vehicles as an aid toward turning. The mono-track vehicle (MTV) steers with a set of appendages that extend from the sides of the vehicle. These steering appendages steer by either causing drag on one side of the vehicle or by titling the vehicle to one side so as to cause the MTV to turn. The MTV has several uses including a radio controlled car, a platform for a metal detection sensor system, etc.

The vehicle disclosed herein includes some form of frame and a motorized belt track directly or indirectly connected to the frame. For example, the belt track can be supported by powered or unpowered wheels, rollers, ball bearings, etc. that are directly or indirectly connected to the frame. The belt track frictionally contacts a drive surface on which the vehicle moves, such as any form of road or off-road surface. The belt track moves (drives) forward and backward in a direction parallel to a center line of the belt track to move the vehicle backward and forward along the drive surface.

The steering appendage is adapted to frictionally contact the drive surface. The steering appendage is off the center line of the belt track, and causes the vehicle to turn from the center line of the belt track when in contact with the drive surface. The steering appendage is adapted to be moved, such that the steering appendage can be selectively placed in contact with the drive surface and selectively removed from the drive surface. The steering appendage comprises an arm and a contact pad. A pivot joint can be used to directly or indirectly connect the steering appendage to the frame.

Embodiments herein therefore provide a method of controlling a travel direction of a mono-track vehicle. This method moves the motorized belt track along the drive surface and frictionally contacts the steering appendage to the drive surface. Because the steering appendage is off the center line of the belt track, the steering appendage causes the vehicle to turn from the center line of the belt track when in contact with the drive surface.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
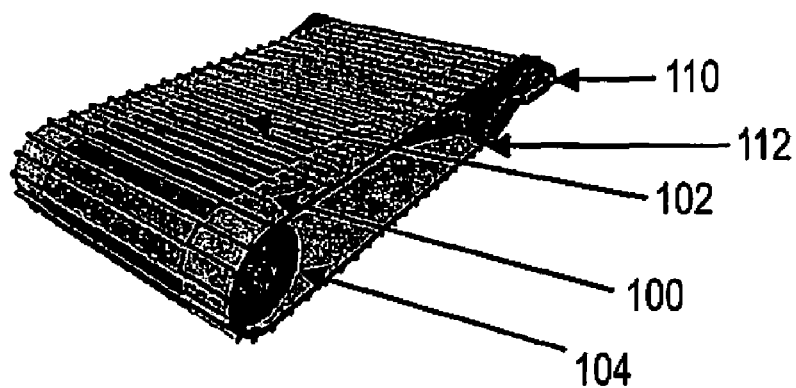
FIG. 1 is a schematic perspective view diagram of a mono-track vehicle.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Figure 2:
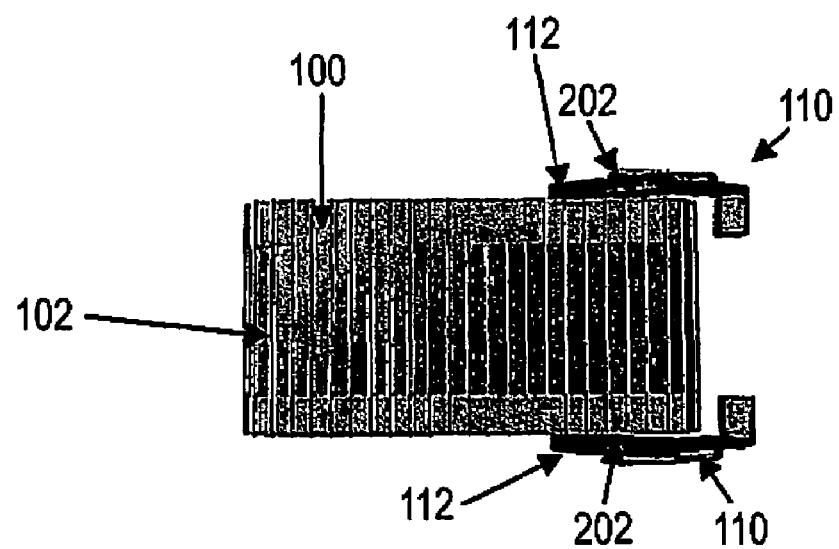
FIG. 2 is a schematic top view diagram of a mono-track vehicle.
Figure 3:
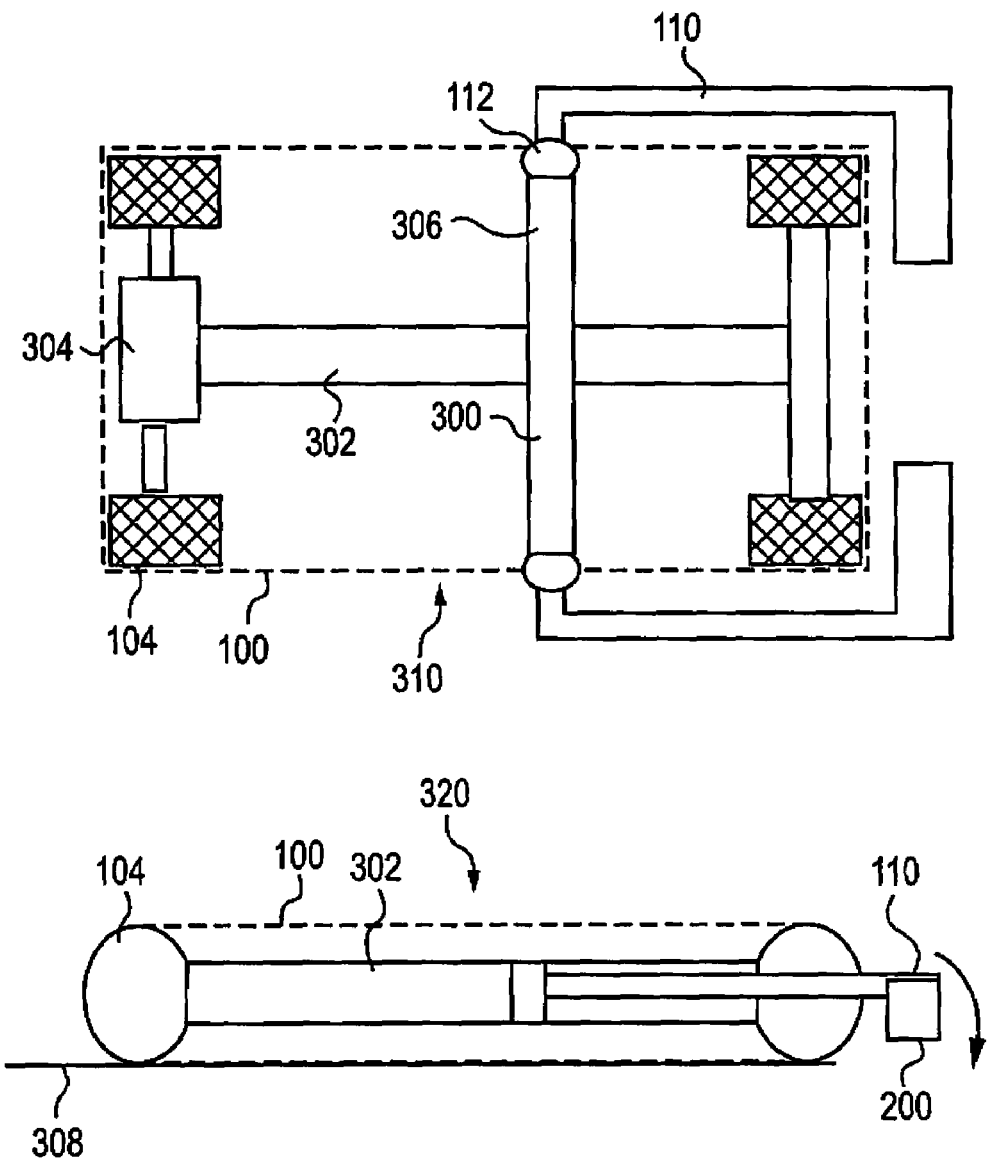
FIG. 3 is a schematic top and side view diagram of a mono-track vehicle.

FIG. 1 is a schematic perspective view diagram and FIG. 2 is a schematic top view diagram of a mono-track vehicle (MTV). The vehicle has a single propulsion track 100 and at least one steering appendage 110. The steering appendage 110 includes a steering foot (contact pad) 200 and an arm 202. As shown in the top 310 and side 320 views in FIG. 3, the vehicle disclosed herein includes some form of frame 302. In FIGS. 1-3, the vehicle uses two steering appendages 110, one of each side of the frame 302. The motorized belt track 100 is directly or indirectly connected to the frame 302. For example, the belt track 100 can be supported by powered or unpowered wheels, rollers, ball bearings, etc. 104 that are directly or indirectly connected to the frame 302.

The belt track 100 frictionally contacts a drive surface 308 on which the vehicle moves, such as any form of ground, road, or off-road surface. The belt track 100 moves forward and backward in a direction parallel to a center line of the belt track 100 to move the vehicle backward and forward along the drive surface 308. The steering appendage 110 is also directly or indirectly connected to the frame 302. The steering appendage 110 is also adapted to frictionally contact the drive surface 308.

The steering appendage 110 is off the center line of the belt track 100. The steering appendage 110 causes the vehicle to turn from the center line of the belt track 100 when in contact with the drive surface 308. The steering appendage 110 is adapted to be moved, such that the steering appendage 110 can be selectively placed in contact with the drive surface 308 and selectively removed from the drive surface 308.

To steer the vehicle left, the left appendage 110 pushes down, via an actuator 300, and makes contact with the drive surface 308. To steer right, the right appendage 110 pushes down, via a different or the same actuator 300 and makes contact with the drive surface 308. The appendage 110 drags on, or sticks to or in, the drive surface 308 and creates a mechanical moment arm that forces the vehicle to turn about the point of drag/contact created by the steering foot 200 contacting the drive surface 308. The appendages 110 can be placed on pivot joints 112 so as to rotate with the vehicle for better steering stability.

FIG. 3 also shows a drive motor 304 connected to one set of wheels 104. The drive motor 304 could include its own power supply (fuel for an internal combustion engine, battery for an electrical motor, etc.) or an external power supply container could be connected to the frame 302. However, as would be understood by those ordinarily skilled in the art, multiple drive motors could be used. For example one motor could be connected to each wheel or each set of wheels. In addition, a data processor, transmitter antenna, etc., could be fixed and supported by the frame 302. For clarity, the mono-track 100 is outlined with a dotted line in FIG. 3 to allow a clear view of the interior components. Other interior layouts are possible. Many different control systems are possible for the MTV. But these are more or less standard parts of any vehicle or robot and therefore, are not shown in this block diagram.

Figure 4:
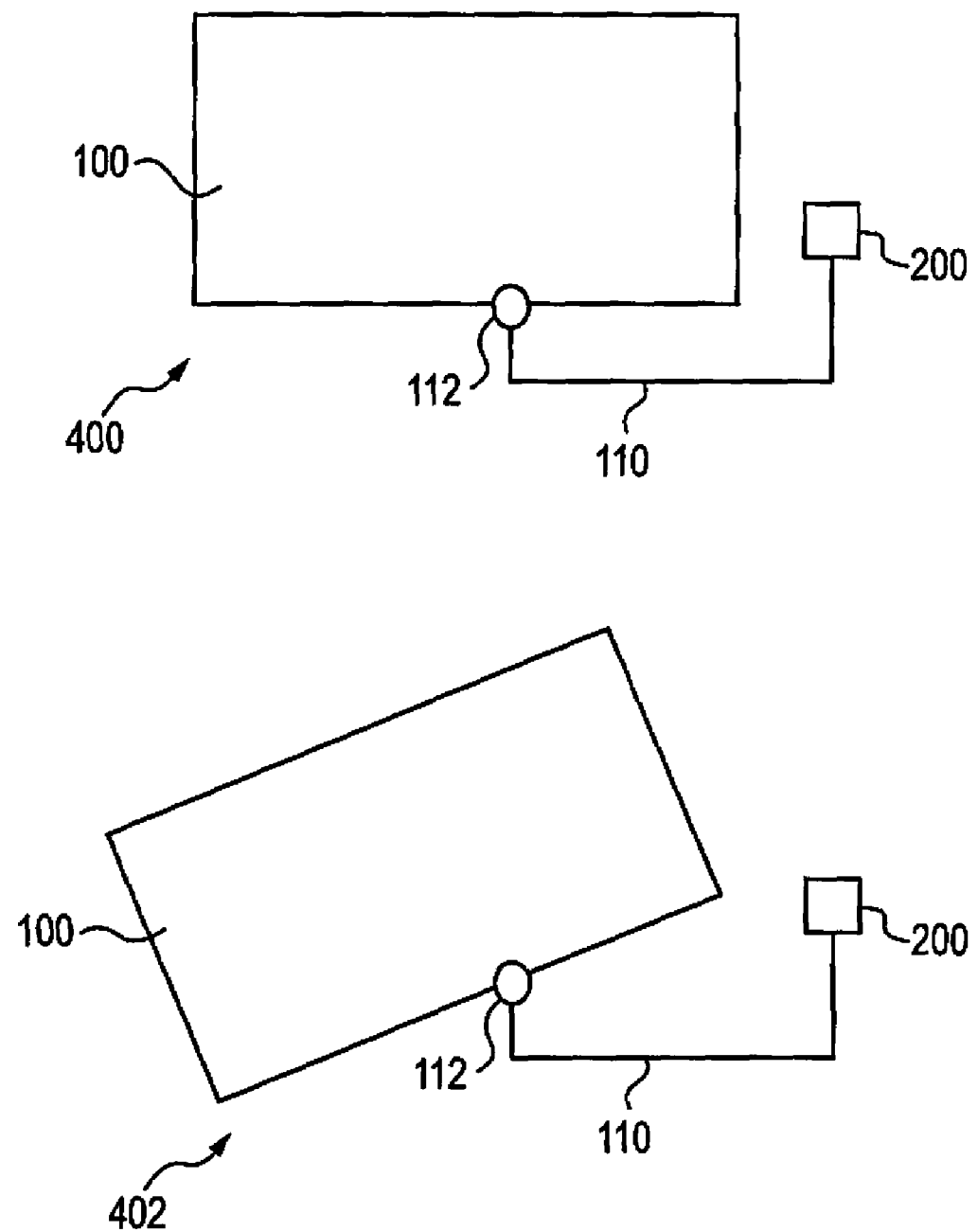
FIG. 4 is a schematic top view diagram of a pivoted and unpivoted steering arm of a mono-track vehicle.

FIG. 4 shows a simplified view of the MTV turning. Item 400 shows the unpivoted steering appendage 110 where the vehicle is not turning and item 402 shows the pivoted steering appendage 110 where the vehicle is turning. In item 402, while the mono-track 100 continues to move, the steering foot 200 drags on the drive surface 308 creating a force that causes the mono-track 100 to rotate about the moment arm created by the appendage 110 steering foot 200 and pivot joint 112 point.

Figure 5:
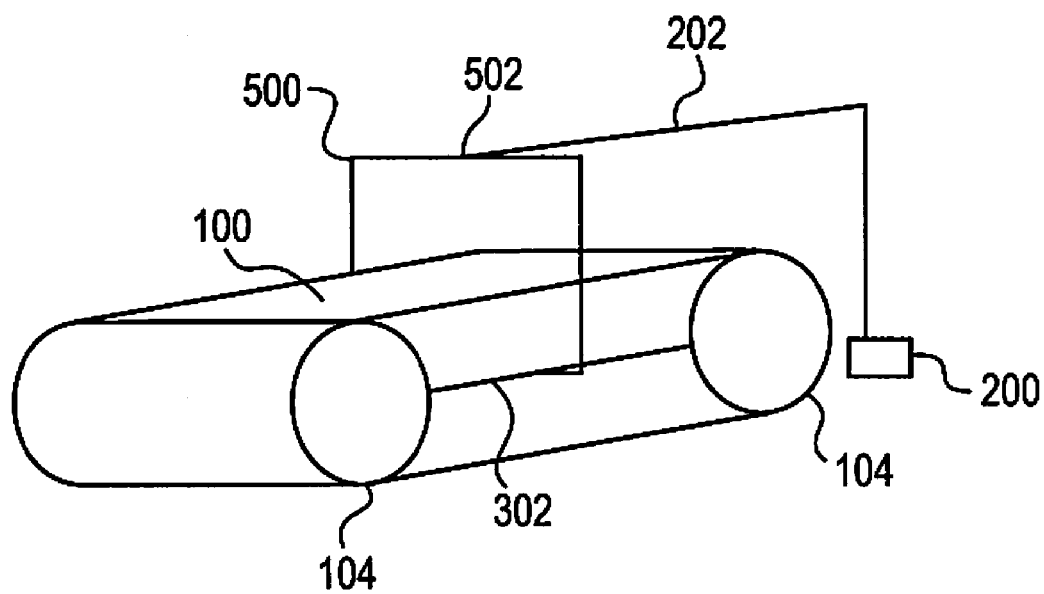
FIG. 5 is a schematic perspective view diagram of a mono-track vehicle.
Figure 6:
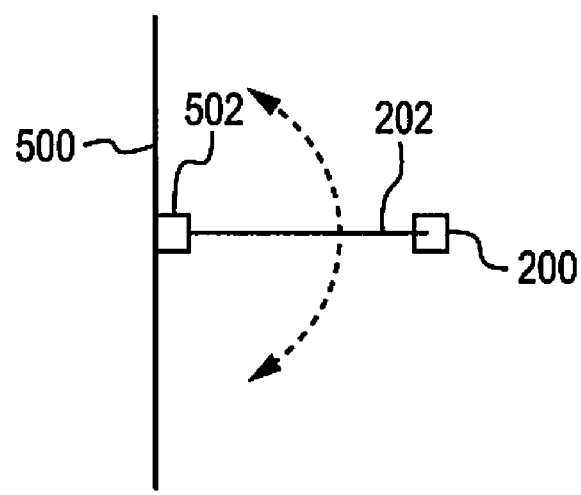
FIG. 6 is a schematic top view diagram of the appendage frame shown in FIG. 5.

In FIGS. 1-3, the vehicle uses two steering appendages 110, one of each side of the frame 302; however, a different number of steering appendages could be used. For example as shown in FIGS. 5 and 6, the invention can use a single steering appendage. FIG. 5 is a schematic perspective view diagram of a mono-track vehicle, while FIG. 6 is a schematic top view diagram of the appendage frame shown in FIG. 5. More specifically, the appendage frame 500 would connect to the vehicle frame 302 and be angled to extend out from below the track 100 to extend above the track, as shown in FIG. 5. For added stability, the appendage frame 500 could be connected to the two sides of the frame 302. Thus, the appendage frame 500 could comprise a square C-shaped structure, with both ends of the C being connected to different sides of the frame. This embodiment also includes a directional actuator 502 that is adapted to move from side to side (as shown by the dashed arrows in FIG. 6) as well as up and down to lower and raise the arm 202 and steering foot 200. Thus, the directional actuator 502 allows the single arm 202 and single steering foot 200 to be lowered on the left side of the vehicle or the right side of the vehicle to cause the steering foot 200 to contact the drive surface to turn the vehicle left or right. The invention is not limited to this specific structure, but instead this is merely an example of one way in which one steering appendage could be used. Alternatively, one side steering appendage (such as shown in FIG. 4) could be used on only one side of the vehicle such that the vehicle could only turn in one direction (completing opposite turns by turning three-quarters (270°) of a circle). Also, multiple steering appendages could be used on each side of the vehicle to increase steering ability and an uneven number of steering appendages could be used on different sides of the vehicle. The actual configuration and placement of the steering appendage(s) is application dependent.

The invention can be used in many different fields including remote controlled vehicles, autonomous robot metal detectors (used, for example, in landmine detection) that have high speed detection capability. In addition, both on-road and off-road applications would find the vehicle useful. One feature of the mono-track 100 is the large surface area that is provided by the track 100 that spans the full width of the vehicle. To the contrary, split track vehicles have narrower tracks that do not provide such a large surface area. In one embodiment, magnetic field sensors (e.g., magneto-resistors) 102 could be embedded in this large surface area of the mono-track 100. The sensors could cover the entire width of the MTV track 100 thus assuring good clearance area. Such sensors would rotate with the track 100 as the vehicle moves. Alternatively, items 102 could represent any useful structures such as solar power cells, light or sound detectors, chemical analyzers, etc.

While the invention has been described in terms of preferred embodiments, those skilled in the art will recognize that the invention can be practiced with modification within the spirit and scope of the appended claims.

What is claimed is:

1. A vehicle comprising:
   a frame;
   a belt track operatively connected to said frame, said belt track being adapted to frictionally contact a drive surface on which said vehicle moves, and said belt track embedded with a magnetic sensor; and
   a steering appendage operatively connected to said frame, said steering appendage being adapted to frictionally contact said drive surface,
   wherein said steering appendage is oriented on opposed sides of said vehicle relative to a center of said belt track.

2. The vehicle in claim 1, wherein said steering appendage is adapted to be moved, such that said steering appendage can be selectively placed in contact with said drive surface and selectively removed from said drive surface.

3. The vehicle in claim 1, wherein said steering appendage comprises an arm and a contact pad.

4. The vehicle in claim 1, further comprising a pivot joint operatively connecting said steering appendage to said frame.

5. The vehicle in claim 1, wherein said vehicle comprises a mono-track vehicle that includes only one belt track.

6. A vehicle comprising:
   a frame;
   a motorized belt track operatively connected to said frame, said belt track being adapted to frictionally contact a drive surface on which said vehicle moves, and said belt track embedded with a magnetic sensor; and
   a steering appendage operatively connected to said frame, said steering appendage being adapted to frictionally contact said drive surface,
   wherein said steering appendage is oriented on opposed sides of said vehicle relative to a center of said belt track.

7. The vehicle in claim 6, wherein said steering appendage is adapted to be moved, such that said steering appendage can be selectively placed in contact with said drive surface and selectively removed from said drive surface.

8. The vehicle in claim 6, wherein said steering appendage comprises an arm and a contact pad.

9. The vehicle in claim 6, further comprising a pivot joint operatively connecting said steering appendage to said frame.

10. The vehicle in claim 6, wherein said vehicle comprises a mono-track vehicle that includes only one belt track.

11. The vehicle in claim 1, wherein said steering appendage causes said vehicle to turn from said center of said belt track.

12. The vehicle in claim 6, wherein said steering appendage causes said vehicle to turn from said center of said belt track when in contact with said drive surface.

* * * * *